United States Patent
Talluri et al.

(10) Patent No.: US 6,748,429 B1
(45) Date of Patent: Jun. 8, 2004

(54) METHOD TO DYNAMICALLY CHANGE CLUSTER OR DISTRIBUTED SYSTEM CONFIGURATION

(75) Inventors: Madhusudhan Talluri, Fremont, CA (US); Bart Smaalders, Menlo Park, CA (US); Sundeep Panicker, Santa Clara, CA (US); Krishna Kondaka, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,330

(22) Filed: Jan. 10, 2000

(51) Int. Cl.[7] ................. G06F 15/177; G06F 15/173
(52) U.S. Cl. ......................... 709/221; 709/223
(58) Field of Search ....................... 709/220–221, 709/222, 226, 229; 714/3–4

(56) References Cited

U.S. PATENT DOCUMENTS

| | | | |
|---|---|---|---|
| 5,283,783 A | | 2/1994 | Nguyen et al. |
| 5,687,308 A | | 11/1997 | Jardine et al. |
| 5,774,660 A | | 6/1998 | Brendel et al. |
| 5,790,772 A | | 8/1998 | Badovinatz et al. |
| 5,822,531 A | | 10/1998 | Gorczyca et al. |
| 5,909,540 A | | 6/1999 | Carter et al. |
| 5,964,838 A | | 10/1999 | Cheung et al. |
| 5,964,886 A | | 10/1999 | Slaughter et al. ........... 714/4 |
| 5,991,518 A | | 11/1999 | Jardine et al. |
| 5,996,001 A | | 11/1999 | Quarles et al. |
| 6,002,851 A | | 12/1999 | Basavaiah et al. |
| 6,003,075 A | * | 12/1999 | Arendt et al. ............... 709/220 |
| 6,108,699 A | | 8/2000 | Moiin |
| 6,363,495 B1 | | 3/2002 | MacKenzie et al. |
| 6,427,163 B1 | * | 7/2002 | Arendt et al. ............... 709/221 |
| 6,438,705 B1 | | 8/2002 | Chao et al. |
| 6,453,426 B1 | * | 9/2002 | Gamache et al. ........... 709/249 |
| 6,532,494 B1 | * | 3/2003 | Frank et al. ................ 709/224 |

FOREIGN PATENT DOCUMENTS

| | | |
|---|---|---|
| EP | 0 817 444 | 1/1998 |
| EP | 0 865 180 | 9/1998 |
| WO | 98/26559 | 6/1998 |
| WO | 99/33227 | 7/1999 |

OTHER PUBLICATIONS

Lamport, "A New Solution of Dijkstra's Concurrent Programming Problem," Aug. 1974, Communications of the ACM, vol. 17, No. 8, pp 453–455.

Preslan et al., "Device Locks: Mutual Exclusion for Storage Area Networks," Mar. 15, 1999, IEEE.

Scheible, "Information Technology, Serial Storage Architecture–SCSI–3 Protocol (SSA–S3P)," Rev. 5b, Apr. 1997.

(List continued on next page.)

*Primary Examiner*—David Wiley
*Assistant Examiner*—Joseph E. Avellino
(74) *Attorney, Agent, or Firm*—Beyer Weaver & Thomas, LLP (57) ABSTRACT

Method for enabling the dynamic modification of cluster configurations, and apparatus including software to perform the method. To enable this dynamic modification, cluster configuration data is stored as a table in a cluster configuration repository that is accessible from all nodes in the cluster. Accordingly, the present invention enables the modification of the cluster configuration from any node in the cluster dynamically. When a reconfiguration command is given, the configuration table is changed and all the nodes in the cluster are notified of the changed configuration in parallel. Following the notification by the nodes of the changed cluster configuration, the changes to the cluster are implemented dynamically as specified by the command.

29 Claims, 5 Drawing Sheets

OTHER PUBLICATIONS

Soltis et al., "The Design and Performance of a Shared Disk File System for IRIX," Mar. 23, 1998, Sixth NASA Goddard Space Center Conference on Mass Storage and Technologies.

VanHalderen et al., "Hierarchical resource management in the Polder metacomputing Initiative," (11/98) Parallel Computing, NL/Elsevier Science Publ., Amsterdam. vol. 24, No. 12–13, pp. 1807–1825.

Chang et al., "An ordered and reliable broadcast protocol for distributed systems", (7/97) Computer Comm., NL/Elsevier Science Publ., Amsterdam, vol. 20, No. 6, pp. 487–499.

Hunt, et al., "Network Disclaimer: a connection router for scalable Internet services," Computer Networks and ISDN Systems 30 (1998) 347–357.

German S. Goldszmidt, "Load Management for Scaling up Internet Services", IEEE, 1998.

* cited by examiner

METHOD TO DYNAMICALLY CHANGE CLUSTER OR DISTRIBUTED SYSTEM CONFIGURATION

CROSS-REFERENCE TO RELATED APPLICATIONS

This application is related to the following applications, filed concurrently herewith, and incorporated herein by reference:

(1) U.S. patent application Ser. No. 09/480,785 SUN1P388/P4541, entitled "METHOD AND APPARATUS FOR MANAGING OPERATIONS OF CLUSTERED COMPUTER SYSTEMS";

(2) U.S. patent application Ser. No. 09/480,466 SUN1P389/P4542, entitled "METHOD AND APPARATUS FOR DYNAMICALLY ALTERING CONFIGURATIONS OF CLUSTERED COMPUTER SYSTEMS";

(3) U.S. patent application Ser. No. 09/479,485 SUN1P390/P4543, entitled "CONTROLLED TAKE OVER OF SERVICES BY REMAINING NODES OF CLUSTERED COMPUTING SYSTEM"; and (4) U.S. patent application Ser. No. 09/479,468 SUN1P391/P4544, entitled "METHOD AND APPARATUS FOR RESOLVING PARTIAL CONNECTIVITY IN A CLUSTERED COMPUTING SYSTEM".

BACKGROUND OF THE INVENTION

1. Field of the Invention

This invention relates to the field of distributed computing systems including clustered systems, and more particularly to the dynamic modification of distributed system configurations while retaining system functionality.

2. Description of the Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access information contained in a database on a server computer system. When the server fails, it is desirable for the distributed operating system to automatically recover from this failure. Distributed computer systems with distributed operating systems possessing an ability to recover from such server failures are referred to as "highly available" systems. High availability is provided by a number of commercially available products including Sun™ Clusters versions 2.X and 3.X from Sun™ Microsystems, Palo Alto, Calif.

Distributed computing systems, such as clusters, may include two or more nodes, which may be employed to perform a computing task. Generally speaking, a node is a group of circuitry designed to perform one or more computing tasks. A node may include one or more processors, a memory and interface circuitry. A cluster may be defined as a group of two or more nodes that have the capability of exchanging data between nodes. A particular computing task may be performed upon one node, while other nodes perform unrelated computing tasks. Alternatively, components of a particular computing task may be distributed among the nodes to decrease the time required to perform the computing task as a whole. A processor is a device configured to perform an operation upon one or more operands to produce a result. The operations may be performed in response to instructions executed by the processor.

Clustering software is often implemented atop an operating system, for instance Solaris™, again from Sun™ Microsystems. Such clustering software enables two or more nodes within a cluster. In more recent versions of clustering software, if one node is reset, shuts down, or loses conductivity with the other nodes, applications running on the node that has shut down automatically transfer operation to other nodes in the cluster.

Some operating system/clustering software implementations further enable one or more nodes within the cluster to be further partitionable into domains. A domain may be said to be defined as a machine running a single instance or copy of an operating system. Domain partitioning is enabled by Sun™ Cluster implemented on the Solaris™ operating system. While this partitioning into domains provides features and benefits beyond the scope of the present invention, the terms "node" and "domain" may be used synonymously herein.

Nodes within a cluster may have one or more storage devices coupled to the nodes. Generally speaking, a storage device is a persistent device capable of storing large amounts of data. For example, a storage device may be a magnetic storage device such as a disk device, or optical storage device such as a compact disc device. Although a disk drive is only one example of a storage device, the term "disk" may be used interchangeably with "storage device" throughout this specification. Nodes physically connected to a storage device may access the storage device directly. A storage device may be physically connected to one or more nodes of a cluster, but the storage device need not necessarily be physically connected to all the nodes of a cluster. The nodes that are not physically connected to a storage device may not access that storage device directly. In some clusters, a node not physically connected to a storage device may indirectly access the storage device via a data communication link connecting the nodes. Accordingly, a node may have access to one or more local and/or global, and/or shared storage devices.

From the foregoing it will be appreciated that the storage options capable of implementation in the various clustering methodologies currently available are highly variable. There are, however, a few guidelines that can generally be said to be applicable to most storage options implemented in clustering solutions. A first general guideline is that the storage option implemented within the cluster should enable a minimum of two pads per disk to insure data redundancy. A second guideline is that the clustering methodology should enable the access, by each node in the cluster, to global storage devices implemented throughout the cluster.

Disk access may be had either through direct access from the node to its respective disk, or through a global storage system. Global storage may be defined to be a disk or device which is connected to some or all of the nodes of a cluster, but which is accessible by all the nodes or domains in the cluster. Examples of file systems include the Unix™ file system or UFS; the Veritas™ file system or VFS, and natural file systems or NFS. One or more of these file systems may be used to implement a global storage methodology.

One of the aims of a highly available (HA) system is to minimize the impact of casualties to any of the individual components of the system. One such casualty would be the failure of the node or disk on the server side. In high availability systems it is advantageous where a first server fails, a second server seamlessly continues operation for all the clients in the cluster. Accordingly, failure of the first server is invisible to the client. Indeed, the client is only aware of a disk failure where all physical access to the disk is lost. Accordingly, one of the goals of high availability systems may be said to retain overall system functionality in the face of changes to the distributed system configuration.

The various nodes within a cluster are typically connected by means of IP addresses, and one cluster can host substantially any number of IP addresses. Sun™ Cluster 2.2 enables failover IP addressing. In this scheme, each IP address is hosted on one single node, and each node has one adapter. In the event that one adapter or node fails, or is reset to the same IP address, the system reestablishes itself on a different server. In this implementation a logical host may be said to comprise an IP address and a disk system, which are inseparable.

Previous clustering products generally require that changes in cluster configuration mandate the system to be taken down, the new cluster configuration made current, and then the system re-started. A truly dynamic cluster configuration management system would enable changes in cluster configuration while retaining system functionality. Indeed, it would be particularly advantageous for a clustering system to enable cluster re-configuration during system operation, which reconfiguration was totally transparent to system users.

In addition to failover IP addressing, Sun™ Cluster 3.0 implements scalable IP addressing. Scalable IP addressing enables servers running on each domain to bind to the same IP address and port. This enables multiple instances of the server process to be started and bound or listening to the same IP address and port. The impact of scalable IP addresses is that when a request is received, there are multiple locales to which the request can be sent.

From the foregoing it becomes evident that managing the many interconnections, features, designs, and topologies of clustering software is a non-trivial exercise. Moreover, managing the several views of a cluster, or distributed, system in such a manner as to minimize the requirement for active user input is an even more difficult challenge. What is necessary is a methodology, which enables the dynamic modification of cluster configurations, while retaining the system's ability to function. What is even more desirable is a methodology that enables the modification of the cluster configuration from any node in the cluster dynamically, whereby the system continues with the computing tasks being performed on the system, despite change in system configuration.

In order to implement such a dynamic cluster modification, it would be needful to store cluster configuration data in such a manner that it is accessible from all nodes in the cluster, for instance as a file. This cluster configuration information includes, but is specifically not limited to: the number of domains or nodes within the cluster or distributed system; individual domain details; information on the several adapters or network interface cards of the system including the number of adapters per node; cluster topology information; black box switch information; cabling information; and information on quorum devices.

When a reconfiguration command is given, a truly utile system would then change the configuration file in parallel on all nodes in the cluster. Accordingly, all nodes in the cluster could then receive notification of the changed cluster configuration in parallel, and the cluster could be configured dynamically as specified by the command.

SUMMARY OF THE INVENTION

The present invention enables the dynamic modification of cluster configurations while retaining overall functionality of the system. In other words, a change to the system configuration may be made without disruption of the computing task or tasks being performed by the nodes of the cluster. To enable this dynamic modification, cluster configuration data is stored as a table in a cluster configuration repository that is accessible from all nodes in the cluster. Accordingly, the present invention enables the modification of the cluster configuration from any node in the cluster dynamically. When the reconfiguration command is given, the configuration table is changed and all the nodes in the cluster are notified of the changed configuration in parallel. Following the notification by the nodes of the changed cluster configuration, the changes to the cluster are implemented dynamically as specified by the command.

These and other advantages of the present invention will become apparent upon reading the following detailed descriptions and studying the various figures of the Drawing.

BRIEF DESCRIPTION OF THE DRAWING

For more complete understanding of the present invention, reference is made to the accompanying Drawing in the following Detailed Description of the Preferred Embodiments. In the drawing.

Reference numbers refer to the same or equivalent parts of the invention throughout the several figures of the Drawing.

DETAILED DESCRIPTION OF THE PREFERRED EMBODIMENTS

While the principles of the present invention may be implemented on a wide range of distributed systems, including clustered systems, the succeeding discussion of one embodiment of the present invention is detailed with reference to Sun™ Cluster version 3.0. Study of the principles enumerated herein will render evident to those having skill in the art modifications required for implementation in other distributed systems. The principles enumerated herein specifically contemplate all such modifications.

Figure 1:
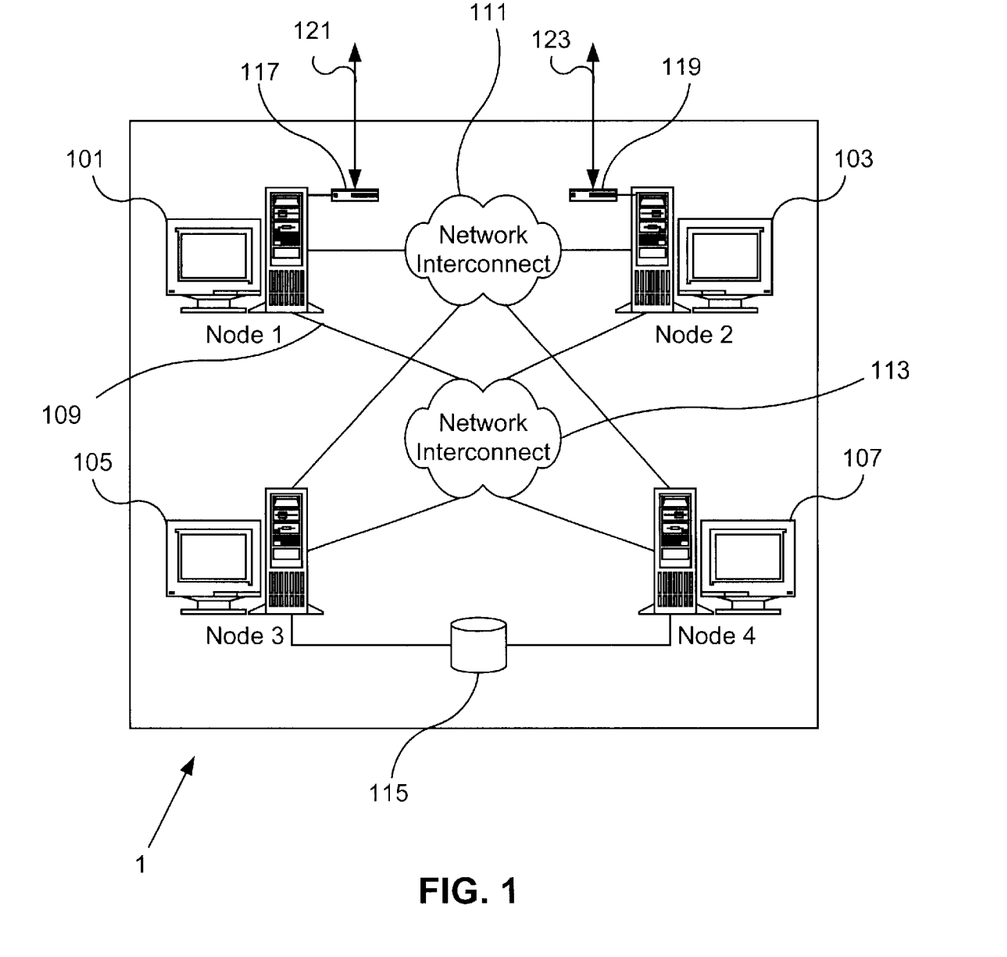
FIG. 1 is a representation of a four-node cluster enabled by, and configured in accordance with one embodiment of the present invention.

An exemplar cluster, 1, enabled by the principles enumerated herein, is shown at FIG. 1. Having reference to that figure, cluster 1 comprises four nodes, or domains 101, 103, 105 and 107. These are connected by a plurality of paths, generally 109 by means of a pair of network interconnects 111 and 113. Dual network interconnections provide redundancy and increase system throughput. Nodes 105 and 107 have direct access to a two-ported shared disk, 115, and provide access to the disk to nodes 101 and 103 by means of the previously defined network interconnects and paths.

The exemplar cluster has access, at 121 and 123, to an external network by means of adapters 117 and 119 connected with nodes 101 and 103 respectively. As is well known in the art, external connectivity may take a number of forms, including but specifically not limited to internet, intranet, wide area networks or WANs, local area networks or LANs, and the like. The adapters required for each of these implementations may vary, but all such connectivities and adapters are contemplated by the present invention.

The exemplar presented here is representational of one cluster topology enabled by the present invention. As is known to those of skill in the art, cluster topologies can take many forms, and the principles enumerated herein specifically contemplate the utilization thereof with a wide variety of clustering systems and topologies.

Figure 2:
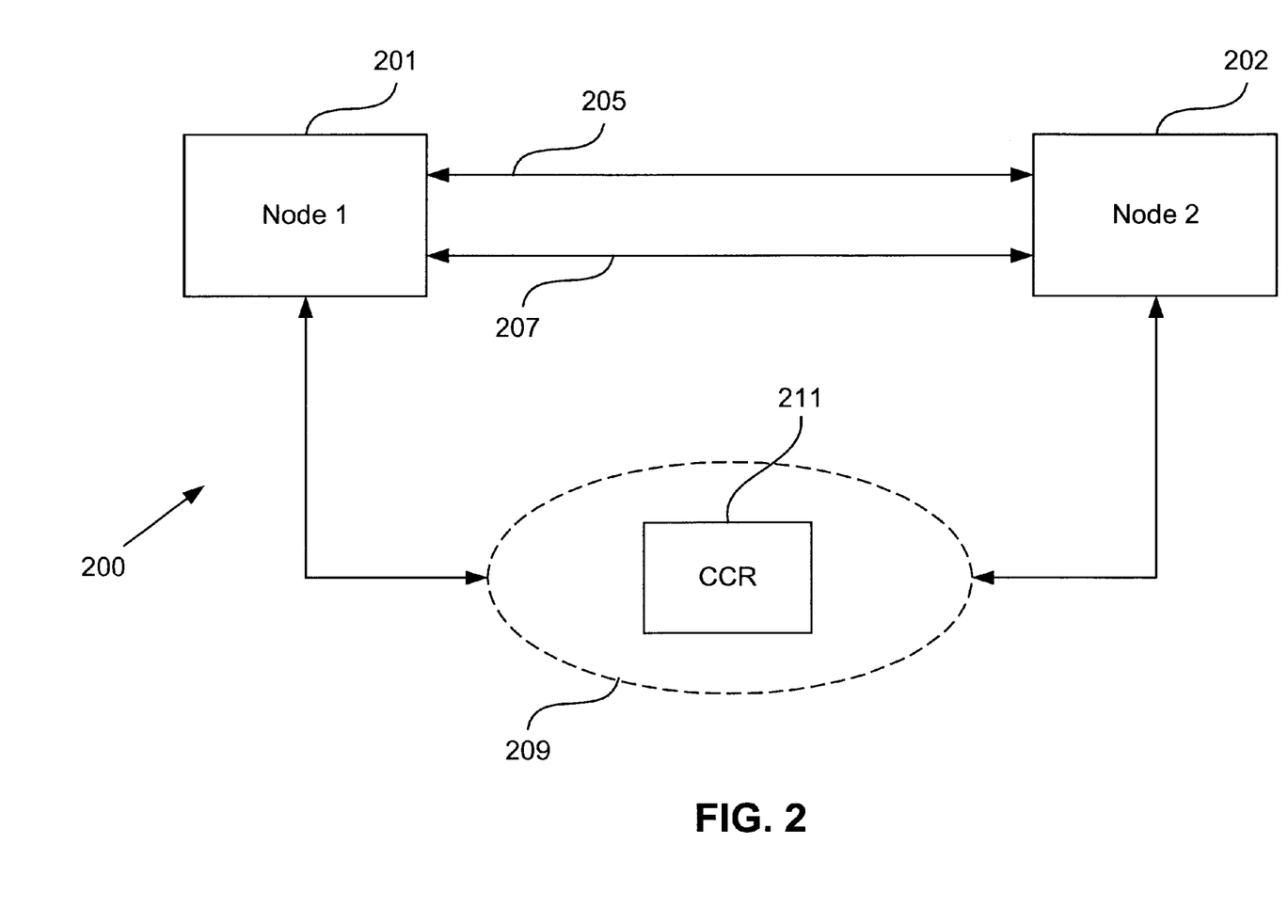
FIG. 2 is a gross overview of the two-node cluster illustrating one implementation of a cluster configuration repository.

One feature of the present invention is the utilization of a cluster configuration repository, or CCR. The implementation of one two-node cluster is shown at FIG. 2. Having reference to that figure, cluster 200 comprises nodes 201 and 202, connected again by a pair of network interconnects 205 and 207 respectively. In this exemplar, nodes 201 and 202 have shared access to a disk 209 on which CCR 211 is implemented. In this example therefore, each of nodes 201 and 202 share CCR 211. Any number of alternatives to this shared method exist. Each node in a cluster may have its own attached disk, each node may have access to its own disk and one or more shared disks, and so forth. The important point regarding CCR implementation is that each node has access to a copy of the CCR, for reasons that will be explained.

Figure 3:
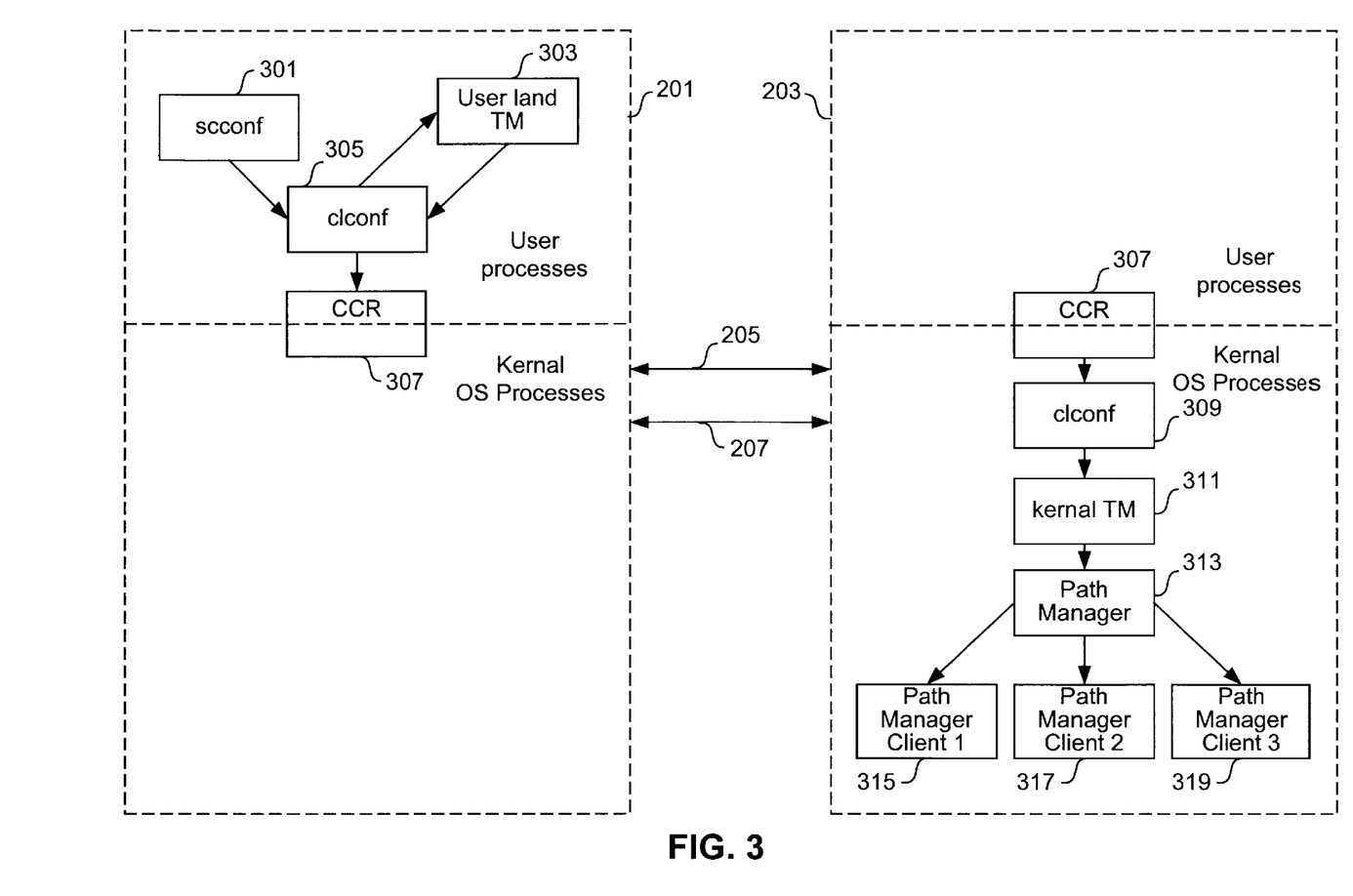
FIG. 3 is a simplified representation of a two-node cluster, each node having both user processes and kernel processes, and presenting an overview of some of the major modules of the present invention.

Having reference now to FIG. 3, an overview of several of the components required to implement the present invention in the Sun™ Cluster product is discussed. Sun™ Cluster consists of a set of nodes connected by a private network. In this exemplar illustration, the two-node cluster is implemented consisting of nodes 201 and 203, connected by network interconnects 205 and 207. While the exemplar shown in FIG. 3 segregates, for the purposes of illustrational clarity, user and operating system processes on two nodes, those having ordinary skill in the art will appreciate that each node in a distributed computing system implements both user and operating system processes. All elements shown in FIG. 3 may reside on all nodes in the cluster. Again, in this implementation, network interconnects 205 and 207 provide a dual interconnect. Some of the components of Sun™Cluster that are relevant to the present invention include:

Topology manager (TM): the topology manager is responsible for managing the topology of the cluster. The topology manager may be considered to operate in two separate threads of execution. The user land topology manager 303 operates in the thread of user processes in a domain. The user land topology manager is responsible for calculating component attributes or properties dynamically, for setting default values component attributes, and for validating the cluster topology. Examples of such component attributes include IP addresses and SCI adapter addresses. The kernel topology manager 311, which operates in the thread of the kernel, or operating system processes, is responsible for the creation and maintenance of the topology graph, and the paths connecting the nodes of the topology. The topology graph describes a logical representation of the connectivity between the nodes of the distributed system, and defines a logical set of the paths between the nodes as a set of point to point links.

CCR: the cluster configuration repository 307 is an on-disk table containing the several elements embodying the cluster topology. CCR 307 is available to each domain in the cluster by means of at least one of a global storage device and a storage device dedicated to that domain. Moreover, CCR 307 is accessible by both user processes and kernel processes within the domain. The specifics of CCR implementation are highly application-specific. Study of the principles enumerated herein will however render evident to those having skill in the art the specifics of CCR implementations necessitated by their own applications.

Clconf: this component, 309, is essentially an in-memory copy of the on-disk CCR table. In one preferred embodiment of the present invention, this in-memory copy is formed as a cluster configuration tree. It will be evident to those having skill in the art that alternative table structures, including, but specifically not limited to tables, files, trees and databases may, with equal facility, be implemented. Clconf also provides various methods to access and modify the tree, as will be later discussed. Both user and kernel processes also access Clconf.

Path manager (PM): path manager 313 is responsible for notifying path manager clients, which clients include transports and other cluster elements that use paths and adapters, for example 315, 317, and 319, of the status thereof. Accordingly, the path manager tracks the status of paths and adapters. Path manager also monitors the status of paths after they have been initialized in the path manager clients.

Scconf: the command 301, which dynamically changes the cluster configuration.

Having continued reference to FIG. 3, the operation of one preferred embodiment of the present invention is summarized as follows: upon entry of a system configuration command, Scconf 301 parses the command line arguments and checks for validity. An error is returned if the command line arguments are used incorrectly. Scconf 301 then gets the current configuration information from clconf 305 as a cluster configuration tree. Scconf 301 makes a copy of this cluster configuration tree and performs the changes necessitated by the cluster change command on this copy of the cluster configuration tree. Scconf 301 also uses clconf 305 to update the configuration table.

Clconf 305 uses the user land TM 303 to verify the new configuration tree, and returns an error if that configuration tree is invalid. If the proposed configuration is valid, user land TM 303 calculates the required component attributes dynamically, and sets default values for the component attributes. Thereafter, clconf 305 updates the configuration file using CCR 307.

Kernel TM 311 has a callback function registered with CCR 307, which is executed on all the nodes in the cluster when the configuration file in CCR 307 is updated. Kernel TM 311 then compares the new topology graph constructed from the new configuration tree with the old topology graph. Kernel TM 311 then makes a list of differences as add, delete, or change action items for the nodes, adapters, switches, and paths defining the topology of the cluster as required by the cluster configuration command.

The action items constructed by kernel TM 311 are then performed on the topology graph and path manager 313 is notified of the changes to the adapters and paths. Path manager 313 then calls the respective path manager clients, in this example, 315, 317 and 319, for instance TCP transport, ipconf, and network fast path, to perform the necessary actions.

Figure 4A:
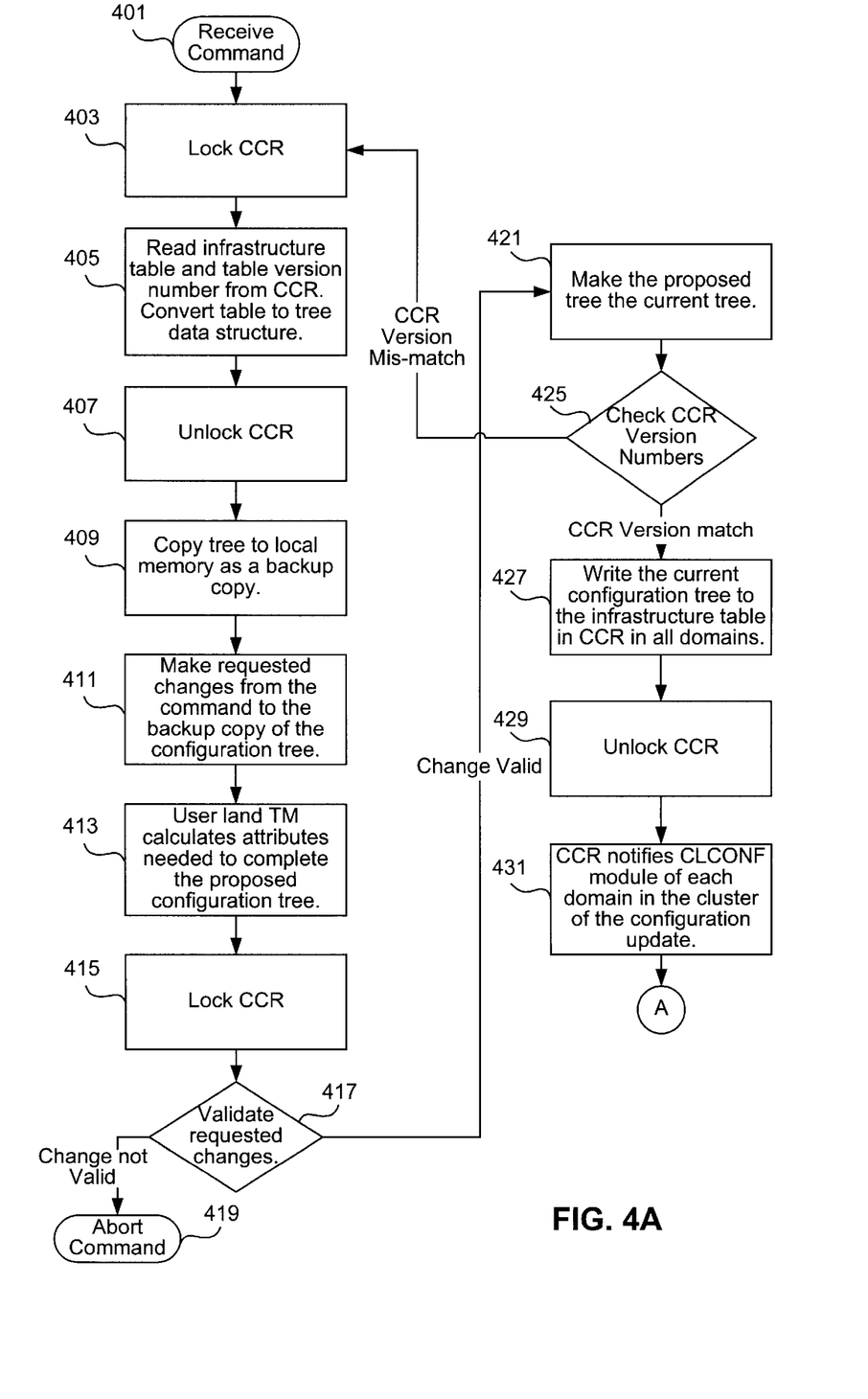
FIGS. 4A and 4B present a flow chart representation of the operation of one preferred embodiment of the present invention.
Figure 4B:
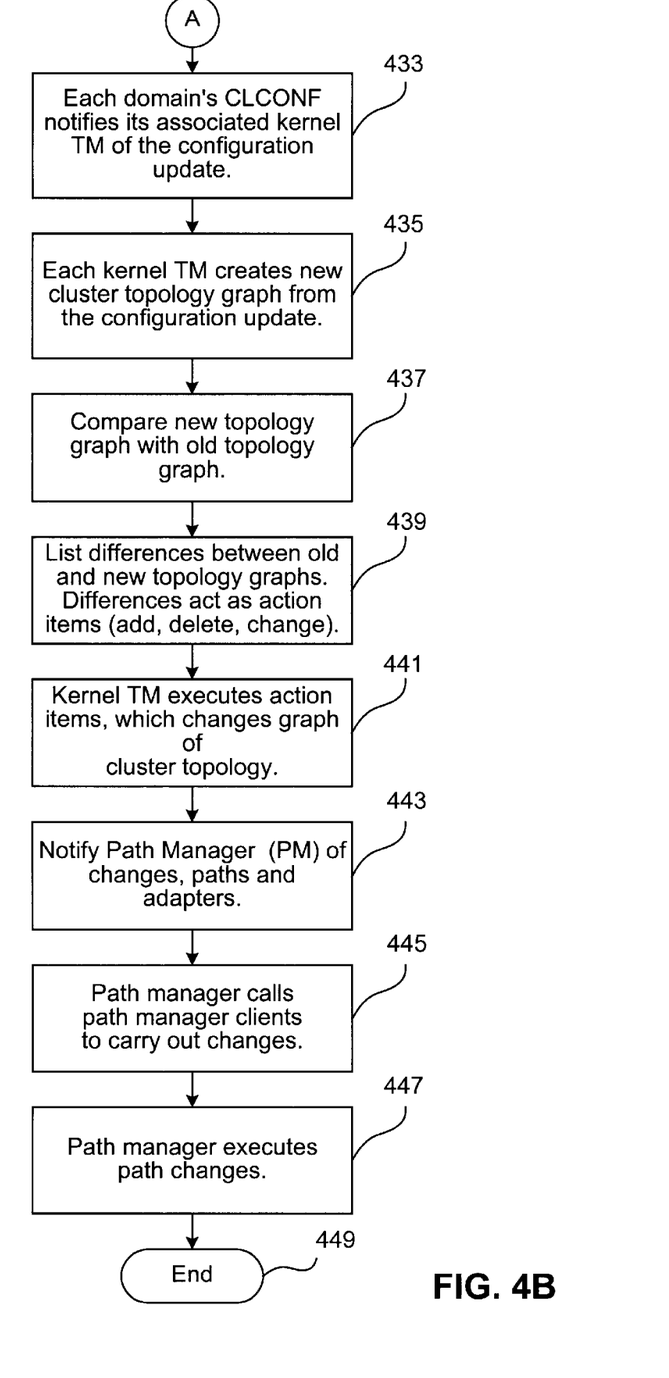

Having reference now to FIGS. 4A and 4B, the previously outlined operation of this embodiment of the present invention is detailed.

At 401, the program receives a command. It will be recalled from the previous discussion, that commands suitable for this operation include add, delete, and change. At 403, the CCR is locked to prevent its alteration during this part of the configuration process. As used herein, "locking" refers to mutual exclusion, which precludes other users or system actions from updating the CCR while it is being used. At 405 the system reads the infrastructure table and the CCR version number from the cluster configuration repository (CCR). The infrastructure table describes the hardware components of the distributed system, and defines the physical connectivity between the components. The CCR version number is updated with each successful system configuration change.

The infrastructure table, which in one preferred embodiment is a flat file, is converted at this point to a tree data structure. Again, alternative table structures, as previously discussed, may also be utilized.

At step 407, CCR 307 is unlocked. This enables the operation of other system processes, not necessarily germane to the present invention, to be conducted during the system configuration change process. Thereafter, at step 409, the system saves the tree data to local memory for use as a backup copy.

At 411, the system makes requested changes from the command to the backup copy of the configuration tree previously stored at step 409. At step 413 the user land topology manager (user land TM) calculates the attributes needed to complete the proposed configuration tree in accordance with the command received at step 401.

At step 415, CCR 307 is again locked, and at step 417 the requested changes are validated. In the event the requested changes are not valid, at step 419 the command is aborted and execution ceases. In the event that the requested changes are valid, at step 421 the proposed tree is made the current tree by the system.

The previously discussed compare and swap operation is performed as follows: At step 425 a comparison is made to determine if the CCR version number read at step 425 is still the same as read at step 403. If it is not, execution returns to step 403. If it is, execution continues at step 427.

At step 427 the current configuration tree is written to the infrastructure table contained in the cluster configuration repository in all domains of the cluster. Thereafter, at step 429 the CCR is again unlocked. At step 431 the cluster configuration repository in each domain notifies the clconf module of each domain in the cluster of the updated configuration. Once each domain's clconf module has been notified of the updated configuration, that module notifies its associated kernel topology manager of the configuration update at step 433.

An alternative embodiment that would not require the locking and unlocking steps at 403, 407, 415, and 429, would simply determine if the update failed. If the update failed each node in the cluster would be notified of the failure, and that the reason for the failure was that the configuration table had been changed between steps 405 and 427.

At step 435 the kernel topology manager of each domain creates a new cluster topology graph from the configuration update previously received. At step 437 a comparison is made between the new topology graph and the old topology graph. As a result of this comparison, at step 439 a list is created which contains the differences between the old and new topology graphs. These differences serve as action items, for instance add, delete, and change the affected cluster components. At step 441 the kernel topology manager executes the action items generated at step 439, which execution changes the graph of the cluster topology within each domain.

At step 443 the path manager is notified of changes to paths and adapters. As a result of these changes at step 445 the path manager calls each path manager client to carry out the required changes. At step 447 the path manager executes the path changes, and execution terminates thereafter at step 449.

Prior art clustering systems required that, to effect cluster re-configuration, the cluster be brought down, the changes made, and the clustering software, at a minimum, be re-booted. The embodiments discussed above present the novel advantage of enabling the dynamic re-configuration of a cluster without the need to take the system down. This is because, in a system constructed in accordance with the principles enumerated herein, only the parts of the cluster changed by the re-configuration are effected thereby. This is true even though all the cluster components are notified of the changes made to various paths, adapters, and so forth.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, while certain table structures are disclosed herein, as previously discussed, alternative table structures may, with equal facility be implemented. Moreover, the principles of the present invention specifically contemplate the incorporation of one or more of the various features and advantages taught herein on a wide variety of distributed data systems. The modifications required to effect these features and advantages on any and all such distributed systems are specifically contemplated by the principles of the present invention.

What is claimed is:

1. A method for dynamically changing the system configuration of a distributed computer system while retaining overall system functionality, the system including a plurality of components and further including a plurality of nodes, the method comprising the steps of:

for each one of the plurality of nodes, storing system configuration data, including component attributes, on at least one storage device accessible by that node and every other node of the plurality of nodes in the distributed computer system;

initiating a command to effect a system configuration changes whereby at least one attribute of at least one component is changed by a first node of the distributed computer system, wherein the first node operates to change the system configuration data by accessing the at least one storage device to change the at least one attribute of the at least one component;

notifying a second node of the distributed computer system of a system configuration change;

accessing the system configuration data, by the second node of the plurality of nodes in the distributed computer system, to initiate changing only the at least one attribute of the at least one system component affected by the system configuration change; and wherein the first and second nodes are not the same node.

2. The method of claim 1, each node further including memory, the distributed computing system configured in accordance with the system configuration data, whereby the changing step comprises, at each one of the plurality of nodes, the further steps of:

responsive to the initiating step, copying the system configuration data from the storage device to the memory as an in-memory copy of the system configuration data;

making changes to the in-memory copy of the system configuration data reflecting the system configuration change; and using the in-memory copy, changing only the at least one attribute of the at least one system component affected by the system configuration change.

3. The method of claim 2 wherein the copying step comprises further steps of:

making a backup copy of the in-memory copy; and making changes to the backup copy reflecting the system configuration change, the backup copy thereby defining the proposed system configuration change.

4. The method of claim 3, wherein the step of changing only the at least one attribute of the at least one system component comprises the further step of:

calculating, from the backup copy, the at least one attribute needed to complete the system configuration change on the at least one affected component.

5. The method of claim 4, wherein the step of changing only the at least one attribute of the at least one system component comprises the further steps of:

notifying a topology manager of the system configuration change;

creating, with the topology manager, a proposed cluster topology graph reflecting the system configuration change;

comparing the topology graph with a previous version of the cluster topology graph;

determining the differences between the proposed topology graph and the previous version of the topology graph, the differences defining action items to effect the system configuration change; and executing the action items, thereby implementing the system configuration change.

6. The method of claim 5 wherein the executing step further comprises the steps of:

notifying a path manager of changes to paths and adapters occasioned by the system configuration change; and calling, with the path manager, the affected clients to effect the system configuration change.

7. The method of claim 1 wherein the step of storing system configuration data comprises the further step of storing the system configuration data in a cluster configuration repository on the storage device.

8. The method of claim 7 comprising the further step of locking the cluster configuration repository during at least a portion of the changing step.

9. A computer readable storage medium storing instructions that, when read and executed by a computer, cause the computer to perform a method for dynamically changing the system configuration of a distributed computer system while retaining overall system functionality, the system including a plurality of components further including a plurality of nodes, the method comprising the steps of:

for each one of the plurality of nodes, storing system configuration data on at least one storage device accessible by the node and every other node of the plurality of nodes in the distributed computer system;

initiating a command to effect a system configuration change whereby at least one attribute of at least one component is changed by a first node of the distributed computer system, wherein the first node operates to change the system configuration data by accessing the at least one storage device to change the at least one attribute of the at least one component;

notifying a second node of the distributed computer system of a system configuration change;

accessing the system configuration data, by a second node of the plurality of nodes in the distributed computer system, to initiate, changing only the at least one attribute of the at least one system component affected by the system configuration change; and wherein the first and second nodes are not the same node.

10. The computer readable storage medium of claim 9 wherein each node further includes memory and access to a storage device, the system defined by the system configuration data, whereby the changing step comprises, at each one of the plurality of nodes, the further steps of:

responsive to the initiating step, at each one of the plurality of nodes copying the system configuration data from the storage device to the memory as an in-memory copy of the system configuration data;

at each one of the plurality of nodes, making changes to the in-memory copy of the system configuration data reflecting the system configuration change; and using the in-memory copy, at each one of the plurality of nodes, changing only those system components affected by the system configuration change.

11. The computer readable storage medium of claim 10 wherein the copying step comprises further steps of:

making a backup copy of the in-memory copy; and making changes to the backup copy reflecting the system configuration change, the backup copy thereby defining the proposed system configuration change.

12. The computer readable storage medium of claim 11, wherein the step of changing only the at least one attribute of the at least one system component comprises the further step of:

calculating, from the backup copy, the at least one attribute needed to complete the system configuration change on the at least one affected component.

13. The computer readable storage medium of claim 12, wherein the step of changing only the at least one attribute of the at least one system component comprises the further steps of:

notifying a topology manager of the system configuration change;

creating, with the topology manager, a proposed cluster topology graph reflecting the system configuration change;

comparing the topology graph with a previous version of the cluster topology graph;

determining the differences between the proposed topology graph and the previous version of the topology graph, the differences defining action items to effect the system configuration change; and executing the action items, thereby changing the cluster topology graph.

14. The computer readable storage medium of claim 13 wherein the executing step further comprises the steps of:

notifying a path manager of changes to paths and adapters occasioned by the system configuration change; and calling, with the path manager, the affected clients to effect the system configuration change.

15. The computer readable storage medium of claim 9 wherein the step of storing system configuration data comprises the further step of storing the system configuration data in a cluster configuration repository on the storage device.

16. The computer readable storage medium of claim 15, comprising the further step of locking the cluster configuration repository during at least a portion of the changing step.

17. Apparatus for dynamically changing the system configuration of a distributed computer system while retaining overall system functionality, the system including a plurality of components further including a plurality of nodes, the apparatus comprising:

> system configuration data stored on at least one storage device accessible by each one of the plurality of nodes;
>
> at least one component having at least one attribute to be changed by a system configuration change; and
>
> a program for:
>
>> initiating a command to effect a system configuration change, whereby at least one attribute of at least one component is changed by a first node of the distributed computer system, wherein the first node operates to change the system configuration data by accessing the at least one storage device to change the at least one attribute of the at least one component;
>>
>> accessing the system configuration data, by a second node of the plurality of nodes in the distributed computer system, to initiate changing only the at least one attribute of the at least one system component affected by the system configuration change: and
>>
>> wherein the first and second nodes are not the same node.

18. The apparatus of claim 17, each node further including memory and access to a storage device, the system defined by the system configuration data, the apparatus further comprising:

> at each one of the plurality of nodes system configuration data copied from the storage device to the memory as an in-memory copy of the system configuration data;
>
> the program further including a process for making changes to the in-memory copy of the system configuration data reflecting the system configuration change, and using the in-memory copy, at each one of the plurality of nodes, for changing only those system components affected by the system configuration change.

19. The apparatus of claim 18 wherein the program further forms a backup copy of the in-memory copy, the program of the apparatus further comprising a mechanism to make changes to the backup copy reflecting the system configuration change, the backup copy thereby defining the proposed system configuration.

20. The apparatus of claim 19, wherein the program calculates, from the backup copy, the at least one attribute needed to complete the system configuration change on the at least one affected component.

21. The apparatus of claim 20, further comprising:

> a topology manager which is notified of the system configuration change;
>
> a proposed cluster topology graph created by the topology manager, the proposed topology graph reflecting the system configuration change;
>
> action items required to effect the system configuration change, the action items defined by the differences between the proposed topology graph and a previous version of the topology graph,
>
> whereby the execution of the action items changes the cluster topology graph.

22. The apparatus of claim 21 further comprising a path manager which is notified of changes to paths and adapters occasioned by the system configuration change and which calls the affect path manager clients to effect the system configuration change.

23. The apparatus of claim 17 wherein the system configuration data further comprises system configuration data stored in a cluster configuration repository on the storage device.

24. The apparatus of claim 23 comprising a mutual exclusion mechanism for locking the system cluster configuration repository during at least a portion of the system configuration change process.

25. A method for changing system configuration of a cluster of computing systems, the cluster computing system including a plurality of nodes, the method comprising:

> storing system configuration data for the cluster in a cluster configuration repository, wherein the cluster configuration repository is stored on a storage device that is directly accessible by each one the plurality of nodes in the cluster;
>
> accessing the cluster configuration repository stored on the storage device by a first node of the plurality of nodes in response to a need for a system configuration change, wherein the first node directly accesses the storage device in order to access the cluster configuration repository;
>
> modifying the cluster configuration repository by the first node after accessing the cluster configuration repository by the first node;
>
> notifying two or more other nodes of the plurality of nodes of a system configuration change;
>
> accessing the cluster configuration repository stored on the storage device by the two or more other nodes when the two or more other nodes have been notified, wherein the two or more other nodes directly access the storage device in order to access the cluster configuration repository; and
>
> initiating, by the two or more other nodes, one or more actions needed to implement changes after the accessing of the cluster configuration repository.

26. A method as recited in claim 25,

> wherein the cluster configuration repository is accessed and effectively changed by a first thread in user space running on the first node; and
>
> wherein a two or more other threads in kernel space running on the two or more other nodes initiate one or more actions needed to implement changes.

27. A method as recited in claim 26, wherein the user first thread is a first topology manager process running in user space and operates to modify the cluster configuration repository.

28. A method as recited in claim 27,

> wherein the two or more other threads are topology managers running in kernel space which operates to:
>> define a series of action items in response to the changes;
>> execute the action items to effect the changes; and
>
> wherein the method further comprises:
>> notifying a path manager of changes; and
>> calling path manager clients to carry out changes.

29. A method as recited in claims 27, wherein the method further comprises:

> registering two or more other nodes of the plurality of nodes with a call back function that notifies the two or more other nodes of a change to the cluster configuration repository.

* * * * *